United States Patent

[11] 3,611,933

[72] Inventor William C. Lanning
Bartlesville, Okla.
[21] Appl. No. 694,649
[22] Filed Dec. 29, 1967
[45] Patented Oct. 12, 1971
[73] Assignee Phillips Petroleum Company

[54] NUCLEAR CAVITY CONFIGURATION CONTROL
11 Claims, 1 Drawing Fig.
[52] U.S. Cl. .................................................. 102/23, 166/36
[51] Int. Cl. ...................................................... F42d 7/00
[50] Field of Search .......................................... 102/22–24; 166/36

[56] References Cited
UNITED STATES PATENTS
2,630,182 3/1953 Klotz, Jr. ....................... 102/23 X
3,303,881 2/1967 Dixon ........................... 166/3 (U.N.E.)

OTHER REFERENCES

Vortman, L. J. A Small-Scale Investigation of Excavation with Parallel Rows of Explosives, Research Report by the Sandia Corporation. SC– RR– 65– 303 TID– 4500 (43rd Ed.) Nuclear Explosions– Peaceful Applications, Pages 15– 29 relied on. Sept. 1965.

Primary Examiner—Verlin R. Pendegrass
Attorney—Young and Quigg

ABSTRACT: The configuration of a nuclear cavity is controlled and/or enlarged by placing auxiliary conventional explosives, directional explosives or small nuclear charges approximately at the circumference of the chimney or cavity expected and exploding these simultaneously or sequentially before, during and/or after the nuclear shock to create a cavity of desired shape which preferably will be substantially cylindrical. In one embodiment, the invention is applied to the enlargement and control of the shape of the desired cylindrical hole or cavity shot in oil shale thus to substantially enlarge the underground retort volume and amount of shale oil which can be recovered from a given formation area. In an embodiment described, the auxiliary explosives surround the expected cavity just outside its circumference. There are placed in the roof as well as at different levels across the cross-sectional area of the expected hole additional auxiliary explosives wherewith to control the roof configuration and to further enlarge the cavity, if needed. Sequential drilling and exploding of a series of charges, especially in the area of the top of the cavity, is disclosed.

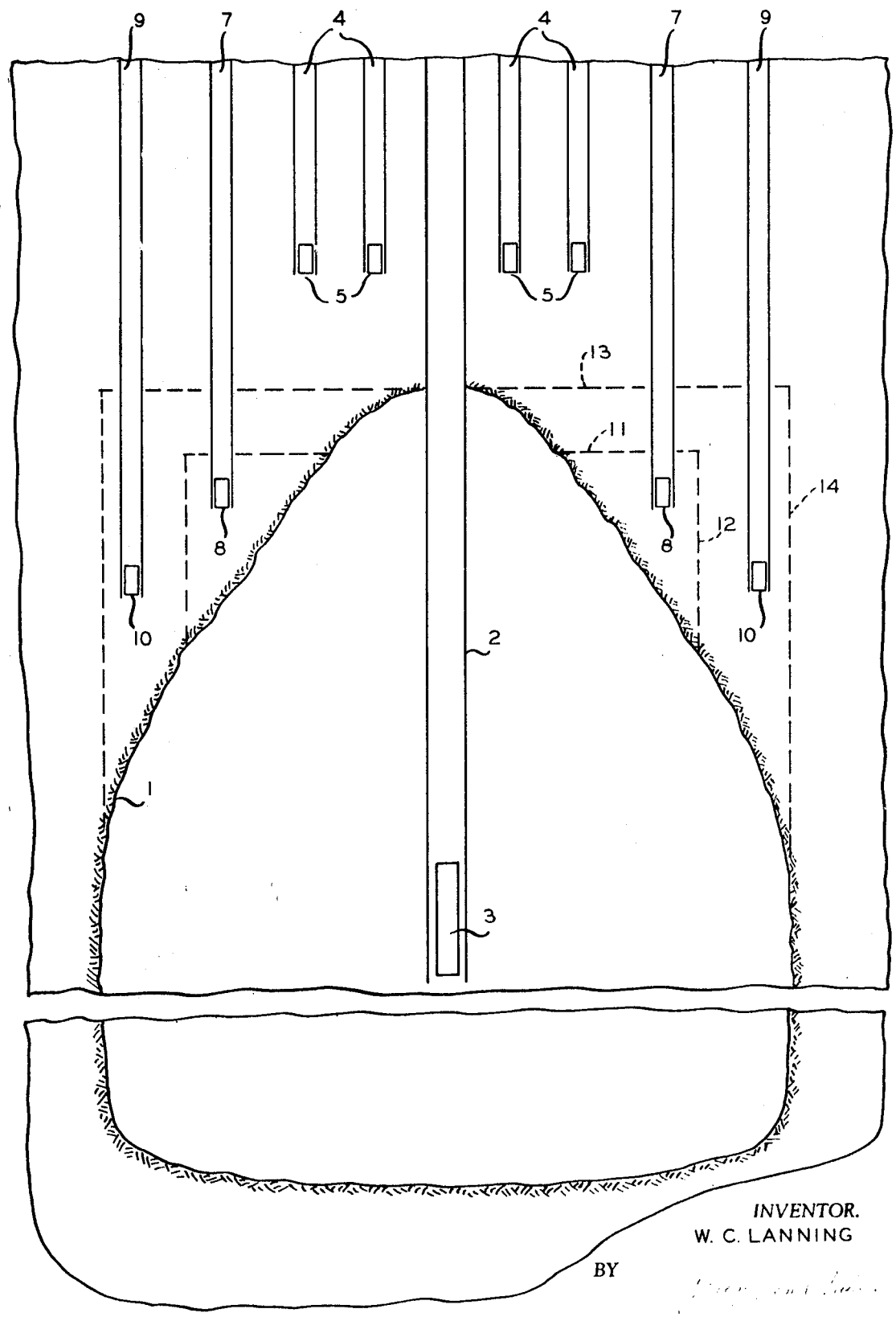

3,611,933

NUCLEAR CAVITY CONFIGURATION CONTROL

This invention relates to the formation and control of the configuration of a nuclear cavity shot or blasted within the ground. In one of its aspects, the invention relates to the formation and control of such a cavity in oil shale.

In one of its concepts, the invention provides a method for producing a nuclear shot cavity in the ground to produce a desired configuration thereof especially at its top so that it will be substantially cylindrical throughout its length from top to bottom which comprises placing explosives of conventional nature, directional explosives and/or small nuclear charges at points surrounding the desired perimeter or configuration of the cavity and exploding such charges simultaneously or sequentially before, during or after the nuclear shot. In another of its concepts, the invention provides for sequential drilling to different areas or depths at a given location with intermediate auxiliary explosions to produce the desired configuration and/or enlargement of the nuclear cavity.

This invention is particularly applicable to the utilization of oil shale and, accordingly, will be described in connection therewith. It will be understood by those skilled in the art, in possession of this disclosure, that the invention is applicable on various size scales to other forms of making a hole in the ground, for example, in coal mining or beneficiation of ores, etc.

The utilization of oil shale has been under study for a number of years. There is an extremely large amount of oil estimated to be available in these reserves. Some have estimated the amount of oil available in these reserves to be as large as all oil reserves now know. Further, it appears, currently, that considerable interest has been shown toward beneficiation of oil shale employing nuclear shots. Plans are now under way for such a beneficiation.

In U.S. Pat. No. 3,001,775, there is disclosed a method of in situ retorting of oil shale deposits wherein shale overlying a void created exteriorly of a substantially vertically disposed hole at the bottom of the shale formation is caved into said hole using explosives placed in holes in the formation overlying the cavity.

I have discovered by consideration of various factors involved that the enlargement and configuration control which is desirable for a nuclear shot cavity can be better accomplished by providing the positive control made possible by surrounding the expected cavity, especially at its top, by suitably placed explosives as herein described, preferably just outside the perimeter of what would be the upwardly extended walls of a substantially cylindrical or otherwise uniformly shaped cavity, and causing the explosives to more or less horizontally displace into the cavity, which may have been formed when this is done, the formation material, e.g. oil shale.

It is an object of this invention to provide a method of procedure for controllably shaping the configuration of a nuclear cavity formed in the ground. It is another object of this invention to provide a procedure for extending desirably upwardly the shape of a nuclear cavity formed in the ground thus to create more rubble than otherwise can be obtained.

Other aspects, concepts and objects of this invention are apparent from a consideration of this disclosure, the drawing, and the appended claims.

According to the present invention, there is provided a method for controlling the size, enlargement and configuration of a nuclear shot cavity which comprises placing into the formation in which the cavity is formed at places surrounding the periphery of the cavity charges which can be denoted to cause collapse of the walls thereof.

In one form of the invention, the charges are placed circumferentially at the upper portion of the cavity approximately at places which are near the largest circumference of the cavity projected upwardly after nuclear shot. These charges can be so arranged and exploded sequentially or simultaneously as to move the portion of the formation which overlies about the largest cross section of the cavity at least in part horizontally and thus into the cavity. For example, it is within the scope of the invention to have several concentrically disposed series of charges and to explode inner series before exploding outer series, thus moving the overburden sequentially into the cavity. Further, the charges can be placed at several levels surrounding the upper portion of the cavity. These charges can also be detonated simultaneously or sequentially to suitable move the overlying portion of the formation.

In the form of the invention now preferred the charges are detonated after the nuclear blast. However, it is within the scope of the invention to cause at least some of the charges to be detonated prior to or during the nuclear shot or blast. The method chosen will depend to an extent at least upon the nature of the formation, the effect of the nuclear blast desired, and other factors evident from this disclosure.

Suffice to say that a nuclear chimney or cavity is formed, the size, enlargement and configuration of which can be controlled, in one form of the invention, to extend upwardly the walls of the cavity from a point approximating its largest diameter or circumference so that the chimney will be essentially of a rectilinear shape. Where the nuclear cavity is made using a single nuclear shot or charge and is substantially cylindrical the charges at the upper portion will be so placed as to approximate the circumference surrounding approximately the largest diameter of the chimney formed during the nuclear shot. In the now preferred form the auxiliary charges are placed just outside the desired upper circumference or cylinder desired to insure that all of the formation or oil shale intermediate the auxiliary shots will be cleaned away as rubble.

Thus, while presently there exists uncertainty as to the size of a cavity or chimney which will result from a nuclear explosion in oil shale or other formation, especially with regard to enlargement by roof-caving of the rock above the explosion, my invention provides a considerably more certain or positive procedure for controlling the size, enlargement and configuration of such a chimney.

The enlargement can be insured and the shape of the chimney controlled by drilling holes along the circumference of the desired chimney, placing the detonating conventional explosives in them to bring about the desired fall of the formation overlying the cavity or expected cavity. Thus, the drilling may be accomplished before the nuclear explosion and the conventional charges set off after a suitable time delay just after the nuclear explosion or the auxiliary charges may all be exploded later as needed. It is within the scope of the invention to employ as auxiliary charges small nuclear charges.

For a large nuclear shot yielding an initial cavity of about a thousand feet in diameter, it is now estimated 15 auxiliary conventional shots would be enough to insure fall of the portion overlying the largest diameter of the cavity so that its walls will be essentially rectilinear.

Improved fragmentation can be accomplished by placing a few additional shot holes scattered over the cross section of the chimney. Successive multiple shots can be used in each hole drilled according to the invention. Operation in this manner adds very little extra cost but provides considerable extra control and additional beneficiation of the formation in an economical manner.

Referring now to the drawing, shaft 2 is drilled in the ground. A nuclear charge 3 is placed in the shaft. It will be understood by those skilled in the art that the depth to which the shaft is drilled is sufficient so that upon plugging the same the nuclear shot will be confined within the ground. A cavity 1 is expected to be formed in this embodiment. Surrounding the expected cavity configuration there are placed according to the invention spaced approximately as shown charges 5, 8 and 10, respectively, in drill holes 4, 7 and 9. After detonation of the nuclear charge 3 the operator, depending upon what he considers has been the effect of the shot, will now detonate at least some if not all of the auxiliary charges 5, 8 and 10. Thus, charges 8 can be detonated to break out the portion of the formation within the dashed lines 11 and 12. He can then detonate charges 10 to break out the portion of the formation encompassed between dashed lines 11, 12, 13 and 14. Finally, if he is dissatisfied with the configuration of the roof portion, he can detonate one or more series or at least a number of the concentrically disposed charges 5.

Reference is made to Boardman et al. Journal of Geophysical Research 69, 3457 (1964). The estimated cavity diameter for an explosion 3,000 feet underground is as follows:

| Yield, Kilotons | Diameter, Feet |
|---|---|
| 100 | 334 |
| 200 | 11 422 |
| 500 | 572 |

These estimates involve judgment of some physical parameters and may vary plus or minus 20 percent, depending on the nature of the formation.

Using the above cavity sizes, the location of shot holes around the circumference of the horizontal cross section of the cavity can be determined readily. The diameter of this circumference need only approximate that of the cavity to insure rock fall and formation of a nearly cylindrical chimney. For example, at an estimated 422-ft. diameter cavity, shot holes can be placed on a circuit 400 to 450 feet in diameter.

One skilled in the art in possession of this disclosure will understand the fracturing around the periphery of the intended chimney before the nuclear blast to form what would be concussion surge chambers and to then have the nuclear blast may yield a better control and a more efficient result. This, of course, involves consideration of rebound of shock wave, etc. Whether this kind of prefracturing is accomplished will depend upon various factors including the depth below the surface of the ground at which the cavity is to be formed. Venting of the nuclear fission products should be avoided.

EXAMPLE

For a cavity produced by a 200 kiloton nuclear explosion, the diameter at explosion level is approximately 425 feet. Idealized caving of the rock produces a rubble-filled chimney about 1,200 feet high. Because of natural development of an arch support, the chimney is less than cylindrical and rock fall is insufficient to fill the cavity with rubble. Around the circumference of the original 425 foot cavity, 15 evenly spaced shot holes are drilled from the surface to about 500 feet below the desired top of the chimney. In the bottom 500 feet of each shot hole is placed 2,000 pounds of ammonium nitrate-based explosive, suitably distributed for effective rock breaking, and the holes are back-filled to contain the blast. In this example, the conventional explosive in the ring of shot holes is detonated after the nuclear detonation and after the rock fall which occurs thereafter. This causes additional rock to fall and form an approximately cylindrical chimney filled with rubble.

While herein has been described an embodiment in which oil shale is a benefactor, it would be apparent to one skilled in the art and having studied this disclosure that the concept of this invention which is disclosed is applicable broadly to operation within the ground, and, therefore, not limited except as in the appended claims. For example, cavities may be created within formations containing various minerals such as oil, gas, coal and sulfur and copper, nickel, cobalt and precious metal ores.

Reasonable variation and modification are possible within the scope of the foregoing disclosure, the drawing and the appended claims to the invention the essence of which is that there has been provided a method for controlling the size, enlargement and configuration of a nuclear shot cavity by placing into the formation in which the cavity is formed at places surrounding the periphery of the cavity charges which can be detonated to cause collapse of the walls thereof, in a particular embodiment the charges being placed circumferentially at the upper portion of the cavity approximately at places which are near the largest circumference of the cavity projected upwardly after the nuclear shot.

I claim:

1. A method for controlling the size, enlargement and configuration of a nuclear shot cavity so that it will be substantially cylindrical throughout its length from top to bottom which comprises placing into the formation in which the cavity is formed adjacent the upper portion at places surrounding the periphery of the cavity conventional explosive charges which can be detonated to cause collapse of the walls of said cavity when formed and detonating said charges.

2. A method according to claim 1 comprising placing the charges circumferentially at the upper portion of the cavity approximately at places which are near the largest circumference of the cavity projected upwardly after the nuclear shot.

3. A method according to claim 2 comprising arranging and exploding the charges so as to move the portion of the formation which overlies about the largest cross section of the cavity at least in part substantially radially and horizontally into the cavity.

4. A method according to claim 2 comprising placing the charges at several levels surrounding the upper portion of the cavity.

5. A method according to claim 2 comprising exploding at least some of the charges after the nuclear shot.

6. A method according to claim 2 comprising exploding at least some of the charges before the nuclear shot to provide a directional effect for the shock waves of the shot.

7. A method according to claim 2 comprising exploding at least some of the charges simultaneously with the nuclear shot.

8. A method according to claim 1 comprising drilling to different depth holes to receive intermediate auxiliary conventional explosives to produce the desired configuration of the nuclear cavity and placing the detonating explosives in said holes.

9. A method according to claim 1 comprising placing conventional explosives just outside the perimeter of what would be the upwardly extended walls of a substantially cylindrical or otherwise uniformly shaped cavity and causing the explosives by exploding them to horizontally displace into the cavity the portion of the formation encompassed within said walls.

10. A method according to claim 1 comprising placing the conventional explosive charges circumferentially at the upper portion of the cavity in substantially concentrically disposed series and exploding an inner series before exploding an outer series, thus moving the overburden sequentially into the cavity.

11. A method according to claim 1 comprising scattering the shot holes over the cross section of the top of the nuclear cavity to assist in moving the walls thereof to accomplish better the substantially cylindrical configuration.